United States Patent [19]

Oliker

[11] 4,324,564

[45] Apr. 13, 1982

[54] ADSORPTION BEDS AND METHOD OF OPERATION THEREOF

[75] Inventor: Michael D. Oliker, Boston, Mass.

[73] Assignee: Near Equilibrium Research Associates, Boston, Mass.

[21] Appl. No.: 166,054

[22] Filed: Jul. 7, 1980

[51] Int. Cl.$^3$ .............................................. B01D 53/04
[52] U.S. Cl. ............................................ 55/20; 55/33; 55/35; 55/62; 55/74; 55/75; 55/77
[58] Field of Search .................. 55/18, 20, 21, 33–35, 55/60, 62, 74, 75, 77, 79, 161–163, 179–181, 208, 387, 389, 390

[56] References Cited

U.S. PATENT DOCUMENTS

| | | | |
|---|---|---|---|
| 2,535,902 | 12/1950 | Dailey, Jr. .............................. | 55/33 |
| 2,562,334 | 7/1951 | Roberts .................................. | 34/34 |
| 2,675,089 | 4/1954 | Kahle ..................................... | 55/62 |
| 2,699,837 | 1/1955 | Van Note ............................ | 55/33 X |
| 2,880,818 | 4/1959 | Dow ....................................... | 55/62 |
| 3,061,992 | 11/1962 | Russell ............................... | 55/62 X |
| 3,137,549 | 6/1964 | Kilgore et al. ..................... | 55/62 X |
| 3,177,631 | 4/1965 | Tamura ............................... | 55/79 X |
| 3,193,985 | 7/1965 | Siggelin ................................ | 55/33 |
| 3,216,178 | 11/1965 | Sauty ..................................... | 55/33 |
| 3,323,288 | 6/1967 | Cheung et al. ..................... | 55/62 X |
| 3,359,706 | 12/1967 | Zankey ................................. | 55/20 |
| 3,446,031 | 5/1969 | Chi et al. ............................ | 55/34 X |
| 3,542,525 | 11/1970 | Pigford et al. ..................... | 55/62 X |
| 3,738,084 | 6/1973 | Simon et al. ........................ | 55/31 |
| 3,808,773 | 5/1974 | Reyhing et al. .................... | 55/31 |
| 3,850,592 | 11/1974 | Huffman .............................. | 55/33 |
| 3,950,154 | 4/1976 | Henderson et al. ............... | 55/33 X |
| 4,012,206 | 3/1977 | Macriss et al. .................... | 55/34 |
| 4,233,038 | 11/1980 | Tao ....................................... | 55/33 |

OTHER PUBLICATIONS

D. Basmadjian, On the Possibility of Omitting the Cooling Step in Thermal Gas Adsorption Cycles, Can. J. of Chem. Eng., vol 53, Apr. 1975, pp. 234–238.
Lukchis, Adsorption Systems, Part I, Chemical Engineering, Jun. 11, 1973, pp. 111–116.
Lukchis, Adsorption Systems, Part II, Chemical Engineering, Jul. 9, 1973, pp. 83–87.
Lukchis, Adsorption Systems, Part III, Chemical Engineering, Aug. 6, 1973, pp. 83–90.
Johnston, Designing Fixed-Bed Adsorption Columns, Chemical Engineering, Nov. 27, 1972, pp. 87–92.
Wankat, The Relationship Between One-Dimensional and Two-Dimensional Separation Processes, AIChE Journal, vol. 23, No. 6, pp. 859–867.
Collins, The LUB/Equilibrium Section Concept for Fixed-Bed Adsorption, Chemical Eng. Progress Symposium Series, vol. 63, No. 74, pp. 31–35.
Rhee et al., An Analysis of an Adiabatic Adsorption Column, Chemical Eng. Journal (1) 1970, 279–290.

*Primary Examiner*—Robert H. Spitzer
*Attorney, Agent, or Firm*—Kenway & Jenney

[57] ABSTRACT

Disclosed is a method of operating adsorption beds of the type which are regenerable with heat and a bed which exploits the method. By altering the timing of the beginning and termination of the adsorption stage, the regeneration stage, and the cooling stage, it is possible to significantly reduce energy consumption, increase the throughput of the bed, provide greater security against breakthrough, produce a more adsorbate-free product, or attain certain combinations of these advantages.

24 Claims, 8 Drawing Figures

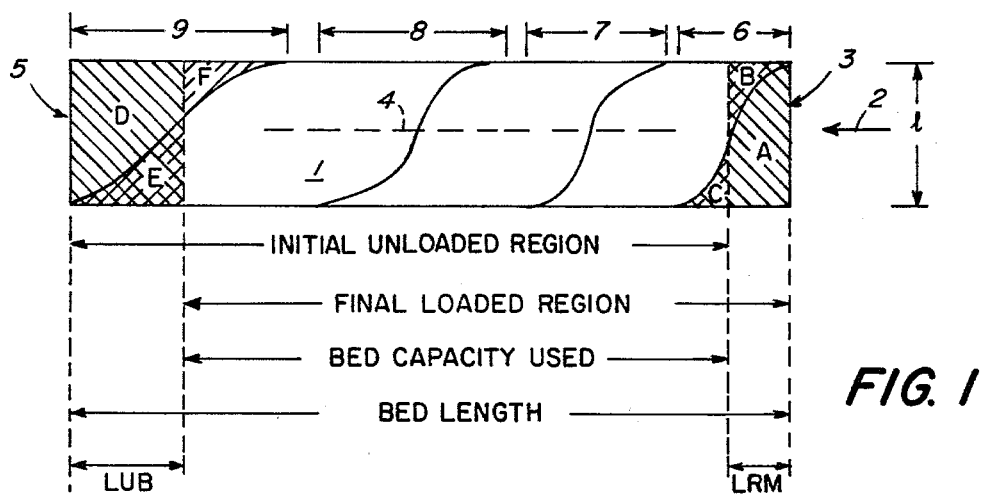
FIG. 1
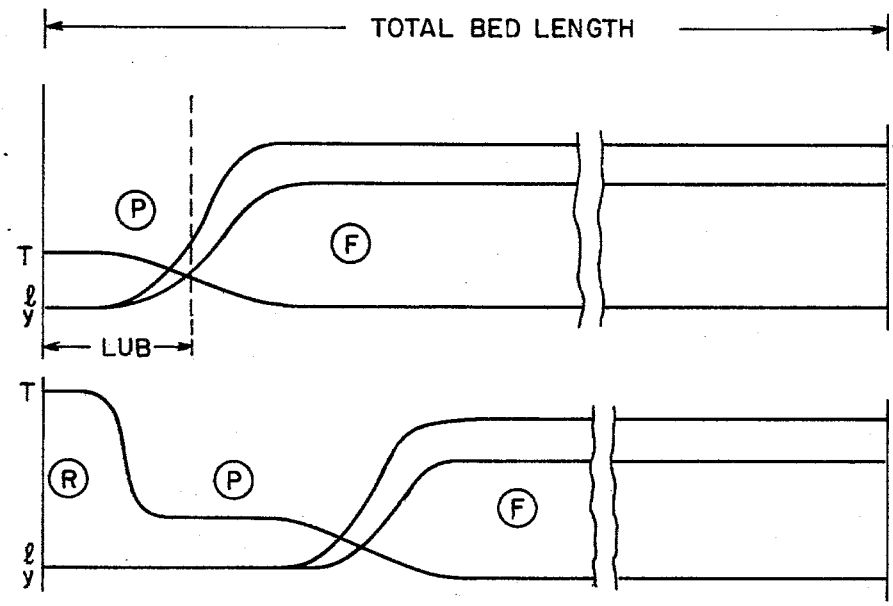
FIG. 2A
FIG. 2B
FIG. 2C
FIG. 2D

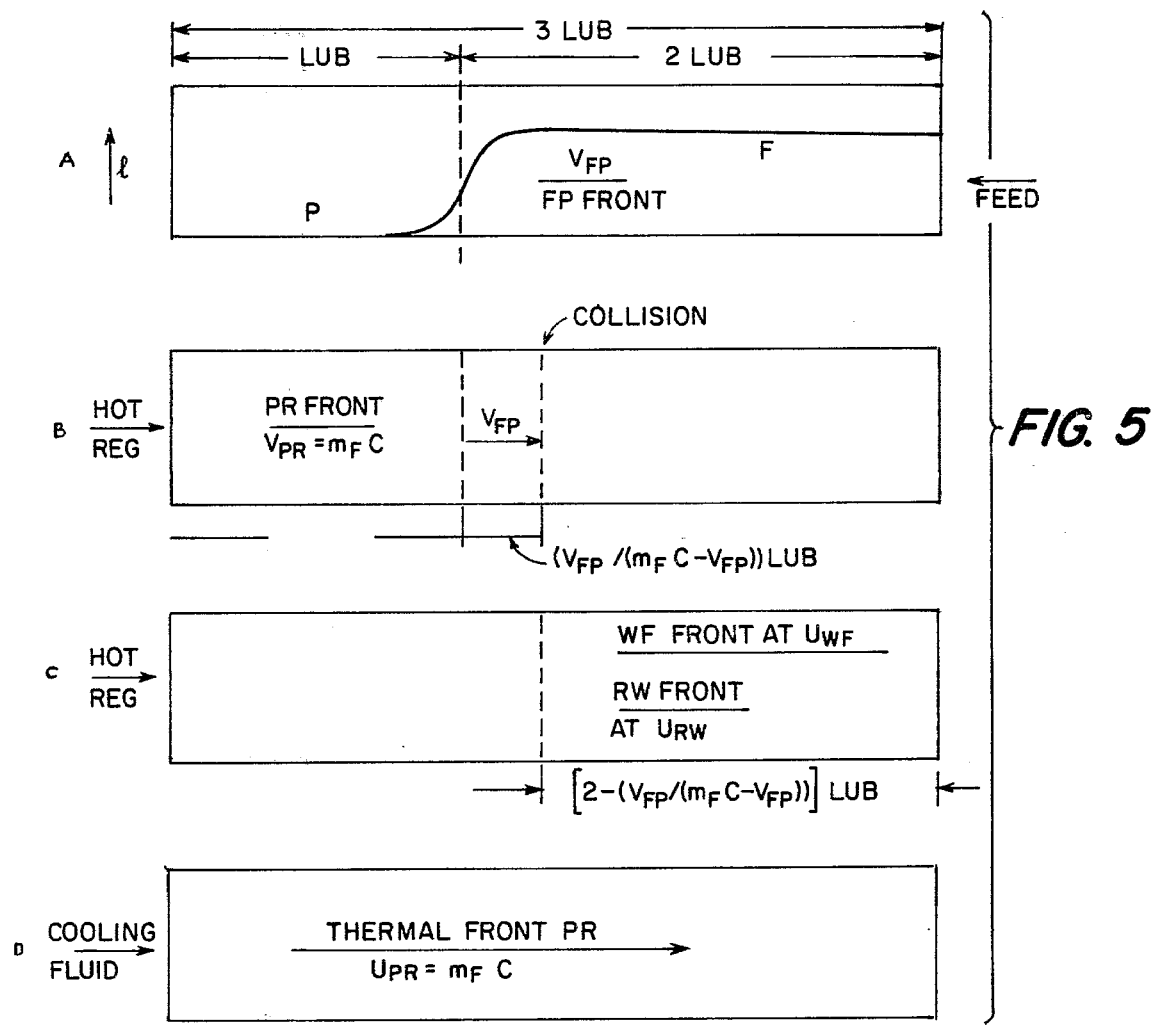
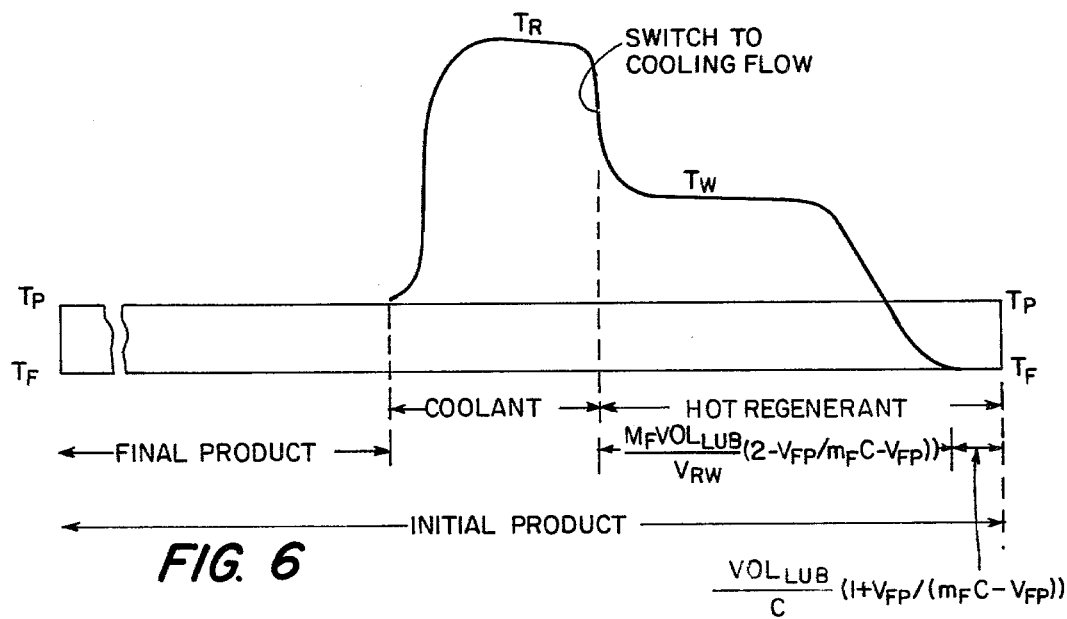

ADSORPTION BEDS AND METHOD OF OPERATION THEREOF

BACKGROUND OF THE INVENTION

This invention relates to an efficient method of operating adsorption beds and to beds designed to exploit the method. More particularly, it relates to a method of operating zeolite, silica gel, alumina, activated carbon, thermally regenerable ion exchange resin and other such beds of the type employed to remove impurities from fluid streams such as natural gas, air, or water.

Adsorbents are widely used for the purification of fluid mixtures. The adsorbent material or materials, typically in particulate form, are contained in a vessel which provides means for passing fluid along a flow path through the interstices among the particles in the bed. A fluid feed stream containing a dilute species (adsorbate) to be removed, typically at concentrations no greater than about 15 percent, is introduced into the bed and passed along the flow path in an adsorption stage. Inside the bed an adsorption wave or front forms which passes along the flow path from a point adjacent the bed entrance in the same direction as the fluid flow, but at a much slower rate.

This adsorption front is the bed region wherein changes in adsorbent loading and adsorbate content in the fluid phase occur. The front's upstream side is bounded by a bed region characterized by adsorbent loadings, adsorbate to fluid feed mole ratios, and temperatures characteristic of equilibrium between the adsorbent material and the feed. On its downstream side, the adsorption front is bounded by a bed region having properties characteristic of equilibrium between the adsorbent material and the substantially adsorbate-free fluid product. Front boundaries are generally not well defined but rather comprise regions which asymptotically approach equilibrium. As the downstream boundary of the adsorption front approaches the bed exit, the concentration of adsorbate in the product begins to rise. When the concentration of the adsorbate in the product at the exit exceeds some predetermined specification, adsorption is discontinued and the bed is regenerated.

In the regeneration stage, a regenerant comprising a hot fluid is passed along the flow path in a co-current, or more commonly, a countercurrent direction. The high temperature of the regenerant produces a desorption front in the bed which drives adsorbate off the surface of the adsorbent material and into the flowing regenerant stream. This process continues until the bed is substantially adsorbate-free, typically as indicated by the emergence of hot regenerant fluid at the bed exit. The hot, adsorbate-free bed is then either cooled or utilized for adsorption service while still hot. The introduction of a coolant produces a thermal front which takes heat from the bed.

Adsorption bed systems of the type described above are known as "thermal swing" systems because they are regenerated with heat. They have been widely utilized in various industries. For example, in preparing air for use in pneumatic systems, water vapor is often first removed from the air using activated alumina or a zeolite. Natural gas is similarly treated before it is liquified or delivered to a pipeline. Activated carbon is used to remove trace quantities of organic vapors from air in solvent recovery operations. Similarly, carbon dioxide, mercury, oxides of nitrogen and sulfur, and hydrogen sulfide may be removed from air or exhausts on zeolite molecular sieves or on activated carbon. Recently, thermally regenerable ion exchange resins have been developed which, for example, can remove salts from water (Dabby et al., *Recent Experience With A New Thermally Regenerable Deionization System,* 37th Annual Int. Water Conf., Pittsburgh, Pa. 10/26-28, 1976).

Industry has tried various approaches to increasing the efficiency of operation of adsorption beds, and in some instances, improvements in the utilization of energy has been the goal. The technical literature primarily focuses on the adsorption stage of the cycle, but regeneration has also been addressed. For example, W. A. Johnston in Chemical Engineering (Nov. 27, 1972 p. 87–92) has noted that the total heat input required for a regeneration is equal to the sum of the sensible heat adsorbed by the vessel housing, the adsorbent material itself, and the mass of retained fluid in the bed, plus the latent heat of desorption required to drive adsorbate from the adsorbent material.

In the June 11, July 9, and Aug. 6 (1973) issues of Chemical Engineering, George M. Lukchis presents an analysis of the thermodynamics of bed chemistry and suggests a model of adsorption which may be used to analyze the performance of commercial units. This permits the designer of such equipment to estimate when adsorption must be stopped to prevent breakthrough, i.e., to prevent contamination of collected product with adsorbate-containing feed. It is suggested that heat utilization can be improved by external or even internal insulation which eliminate heat loss. At page 88 of the August 6 article, it is noted that cooling and heating fronts which pass through such beds are not infinitely short and that the observed spreading of fronts precludes stopping the purged gas flow as the front reaches the effluent end of the bed. In The Canadian Journal of Chemical Engineering (Volume 53, April, 1975, pages 234) D. Basmadjian in an article entitled, *On the Possibility of Omitting the Cooling Step in Thermal Gas Adsorption Cycles* suggests that since the heat removed from the bed after regeneration often cannot be utilized in any significant way, it may often be advantageous to entirely omit the cooling stage. The conditions under which beds can be operated in this manner are disclosed.

Other publications directed to this general topic include U.S. Pat. Nos. 3,808,773 (Reyhing et al.), 3,359,706 (Zankey), 3,738,084 (Simonet et al.), and 4,012,206 (Macriss et al.) In the Simonet patent, a bed layered with different adsorbents is used, and thermal input is minimized by reuse of heat. In the Macriss et al. patent, a method of operating an adsorbent bed is disclosed which involves the use of sensible heat remaining in the bed after desorbing gaseous oxide contaminants to aid in the removal of adsorbed water vapor contained downstream of the hot zone.

SUMMARY OF THE INVENTION

It has now been discovered that by suitably modifying the cycle of operation of beds of the type described above it is possible to significantly reduce the quantity of heat needed for regeneration, to increase the throughput of a bed of a given size, to decrease the size and thus the capital costs of a bed system required to achieve a given capacity, to upgrade the quality of the product (reduce adsorbate concentration), and to provide greater security against breakthrough of feed during the adsorption stage. Any one or a combination of these advantages may be achieved by following the operational parameters and design principles disclosed herein.

Because the operational method described herein arose from an in depth study of the thermodynamics and kinetics involved in the operation of adsorption bed systems regenerated with heat, and because the method involves timing of the four fronts often created in the bed during use, the operational method disclosed herein is named the "Four Front Method".

During regeneration there is created in the bed a front, designated herein as the "RW" front, which is bounded on its downstream side by bed conditions characteristic of equilibrium between the adsorbent material and fluid waste ("W", adsorbate rich effluent), and on its upstream side by bed conditions characteristic of equilibrium between the adsorbent material and hot regenerant fluid ("R"). Upon the subsequent introduction of cooling fluid, there is also created a wave or front, designated herein as a thermal front, which moves more rapidly than the RW front. The thermal front can arise in several ways. When regeneration is conducted using sufficiently hot fluid containing a substantial concentration of adsorbate and the coolant is adsorbate-free, a "PR" transition is created comprising a stripping front which effects the removal of the adsorbate in equilibrium with the hot regenerant, and a thermal front which effects the major amount of temperature transition. Upstream of this transition from equilibrium with coolant to equilibrium with regenerant, the bed is in equilibrium with coolant (here assumed to be product, "P", for purposes of simplicity). Downstream of the transition the bed is in equilibrium with regenerant ("R"). Other situations where adsorbate is present in the regenerant and/or the coolant produce multiple fronts which together form the PR transition, one of which comprises the major thermal front. When regeneration and cooling are accomplished using substantially adsorbate-free fluid, the PR transition is a pure thermal wave which is bounded on its downstream side by bed conditions characteristic of equilibrium between the adsorbent and the hot regenerant fluid, and on its upstream side by bed conditions characteristic of equilibrium between the adsorbent and the cooling fluid.

In its broadest aspects, the invention resides in the discovery that the cooling fluid may be introduced into the bed prior to the breakthrough of the midpoint of the RW front through the bed exit to achieve many significant operational advantages. Preferably, introduction of the cooling fluid is timed such that the thermal component of the PR transition is present in the last third of the bed length or most preferably at the fluid exit when the slower RW front is at or breaking through the fluid exit. Operation of the bed in this manner can result in a waste fluid whose temperature as measured at the bed exit never attains the temperature of the hot regenerant. As one result, significantly less heat is required to regenerate the bed. In a preferred method of operation, the sum of the mass of hot regenerant and cooling fluid does not exceed 60% of the mass of the feed.

The precise timing of the beginning and end of the adsorption stage and the hot regenerant and cooling fluid steps of the regeneration stage for a given system depends primarily on bed length, the particular adsorbate-adsorbent pair involved, fluid flow rates, and a balancing of the importance of the desired product characteristics, the reduction in heat comsumption, the desired degree of security against breakthrough, and the maximization of throughput. By following the principles disclosed herein, those skilled in the art will be able to estimate from theoretical data and precisely determine empirically all of the parameters required to take full advantage of the invention.

Where the feed material is delivered at a substantially constant flow rate and has a substantially constant adsorbate content, the changes from adsorption duty to regeneration, from hot regenerant flow to cooling flow, etc., can be triggered automatically by a signal generated by a timer. Flow integrators may also be used. In situations where feed parameters vary, timers may nevertheless be used provided less than maximal exploitation of the operational method of the invention is tolerable. The system would be designed on a "worst case" basis such that a selected maximum adsorbate loading would not be exceeded, and the timers would be set to initiate adsorption, regeneration, and cooling as if maximal loading had occurred. In this case substantial advantages are achieved as compared with the prior art, although full benefit of the system is not obtained.

Alternatively, the system can be controlled by one or more sensors which detect an intrinsic property characteristic of fluid at a selected point within the bed. Temperature sensors disposed within the adsorbent bed or devices for directly or indirectly sensing adsorbate concentration may be successfully employed. For example, it is possible to use an adsorbate concentration sensor suitably positioned within the bed which provides a signal to start cooling flow when it detects, e.g., a 50% decrease in adsorbate concentration from a maximum value ($Y_{MAX}$).

As a consequence of the method of operation disclosed herein, the engineering advantages achieved in the prior art by the use of relatively long adsorption beds are significantly reduced, and shorter beds become practical, including beds defining a radial fluid flow path. Also, the beds may take the form of a compartmentalized structure which includes means for directing feed, regenerant, or cooling fluid through a selected compartment so that adsorption, regeneration, and cooling occur simultaneously in different bed regions. The regenerant fluid used in the process of the invention may comprise heated product, heated feed, a separate heated purge gas, or hot, recirculated waste fluid from which the adsorbate has been at least partially removed.

Objects of the invention include the provision of an improved adsorption bed and a method of operating an adsorption bed which avoids the generation of excess waste heat, reduces the bed size needed to achieve a given throughput, reduces the quantity of regeneration fluid needed, and/or allows a larger margin of safety against the release of adsorbate into the product stream. Another object is to provide an improved adsorption bed and a method of operating an adsorption bed which insures a product of higher and more uniform purity. Still another object is to decrease heat consumption in thermal swing adsorption bed systems by utilizing sensible heat contained in the bed for regenerating the bed.

These and other objects and features of the invention will be apparent from the following description and from the drawing.

BRIEF DESCRIPTION OF THE DRAWING

FIG. 1 is a schematic illustration of an adsorption bed useful in describing the adsorption stage and the concept of a front wherein bed loading (moles adsorbate per liter of adsorbent) is depicted graphically on the bed's vertical axis;

FIGS. 2A–2E are schematic diagrams illustrating the sequence of events which occurs during a complete cycle in an adsorption bed operated in the conventional (prior art) manner. The horizontal axis represents the length of the bed and the vertical axis represents increasing (upward) temperature (T), bed loading (l), and adsorbate/fluid feed mole ratio (y);

FIG. 5 is a schematic diagram similar to FIG. 2 illustrating the sequence of events which occurs during an exemplary complete cycle of operation in accordance with the prior art;

FIG. 6 is a graph illustrating the temperature (vertical axis) of the effluent stream exiting the adsorption bed during regeneration as described with reference to FIG. 5. The horizontal axis represents mass of product;

DESCRIPTION

Front Behavior

Figure 2E:
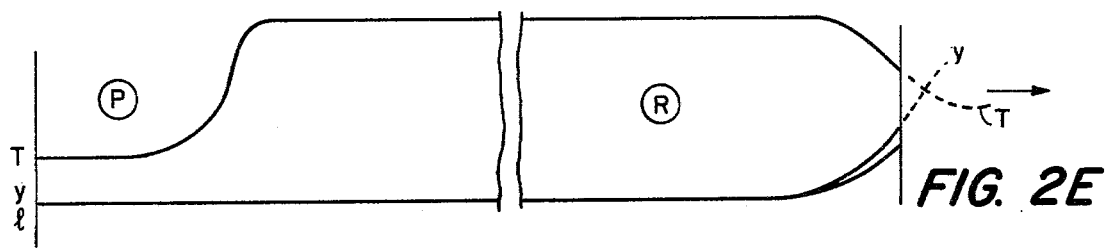

In order to fully understand the nature and advantages of the invention, it is necessary to understand certain aspects of the physical chemistry of bed systems.

In the normal operation of adsorption beds, a feed fluid bearing an adsorbate (e.g., water vapor) enters the bed and is "purified" as the adsorbate is adsorbed (loaded) onto the adsorbent material (e.g., silica gel). A product of significantly reduced adsorbate concentration exits the bed. When the bed is loaded to its capacity, the product begins to exhibit increasing adsorbate content, and the bed must be regenerated.

Changes in an adsorption bed take place through the medium of waves or fronts. These consist of profiles or spacial variations in the concentration of adsorbate (y) in the feed fluid, loading of the adsorbate on the solid (l) and temperature of the solid and fluid (T). The fronts move along the bed in the direction of fluid flow but at a much slower rate. A front consists of a transition from one equilibrium condition in the bed to another. From the midpoint of the front, each equilibrium condition is approached asymptotically. As the front moves, the adsorbent material and the fluid in the bed exchange heat and mass. For example, during the adsorption stage, the upstream region of the bed that is near equilibrium with the fluid feed grows progressively larger while the downstream region that is near equilibrium with the fluid product grows progressively smaller. The product fluid exiting the bed is thus substantially in equilibrium with the original (pre-adsorption) condition of the bed. As adsorption continues, the product exiting the bed moves progressively further from this equilibrium state as the front approaches the bed exit and in the extreme (as the adsorption front breaks completely through) approaches a composition identical to the feed. In any industrial operation, the adsorption stage is terminated well before breakthrough.

For convenience, the various fronts discussed herein are named for the equilibrium conditions which bound them, with F representing feed, R representing regenerant, P representing product (and coolant fluid), and W representing waste. Thus, for example, the adsorption front described above is termed an FP front. The speed of a front in the direction of flow can be defined on the basis of a mass balance or heat balance. Regarding the mass balance, the adsorbate lost by the fluid in passing through a unit volume containing the front must equal the adsorbate gained by the adsorbent (increased bed loading) which results from the motion of the front. Thus, where $v_l$ is the loading velocity in mass of bed traversed by the front per unit time (or volume, length, or other extensive bed property per unit time), $m_f$ is the fluid flow rate. $\Delta y$ is the fluid concentration transition (the change in adsorbate concentration of the fluid measured across the front), and $\Delta l$ is the loading transition across the front, $$v_l = m_f(\Delta y/\Delta l)$$

Regarding the heat balance, the thermal velocity can be defined by balancing the fluid enthalpy lost with the bed heat gained, where fluid enthalpy is the sum of sensible heat plus latent heat due to the presence of adsorbate. Thus, when $v_T$ equals thermal velocity $Cp_s$ and $Cp_f$ are the respective heat capacities of the solid and fluid, and $-\Delta H_{ads}$ is the heat of adsorption, $v_T(Cp_s\Delta T) = m_f[Cp_f\Delta T + (-\Delta H_{ads})\Delta y]$. Thus, $v_T = m_f(Cp_f/Cp_s + (-\Delta H_{ads})/Cp_s \cdot \Delta y/\Delta T)$. If the ratio of the heat capacities of the fluid and solid is defined as C and the ratio of the heat of adsorption to the heat capacity of the solid defined as H, then $$v_T = m_f(C + H\,\Delta y/\Delta T)$$

From the foregoing it is apparent that when $\Delta y$ is equal to zero (i.e., when no adsorption or desorption is taking place), thermal velocity depends only on the fluid flow rate and the ratio of the heat capacities of the fluid and solid: $v_T = m_f C$. When $\Delta y/\Delta T > 0$, a "fast front" results; when $\Delta y/\Delta T < 0$, a "slow front" results. Thermal velocity and mass velocity in some cases can be equal. Also, as noted above, fronts can grow or contract and do not have sharp boundaries.

The Adsorption Stage

The adsorption or FP front behaves identically in the prior art and in the four front method of this invention. Specifically, the entering fluid feed is cool and contains a relatively large amount of adsorbate, and the exiting product leaves the bed at a higher temperature and is largely adsorbate-free. The bed, initially warm and sorbate-free for the most part, gains adsorbent and loses heat as fluid is passed therealong. One difference between the method of the invention and the prior art is that in the four front method the regeneration process may leave some adsorbate in the bed adjacent the feed entrance. This amount of adsorbate is referred to herein as the "residual mass" (or RM) and can serve as the initial state for the adsorption stage. Because in the prior art cooling is normally not started until regenerant breaks through, little or no residual mass is present in the bed at the start of the adsorption stage.

When the adsorbate concentration of the product fluid exiting the bed exceeds a selected predetermined specification, adsorption is stopped. This results, in both the prior art and the four front system, in a section of the bed adjacent the exit remaining only slightly loaded with adsorbate. This section is termed herein, length of unused bed, or LUB. The FP adsorption front may expand or contract as it moves along the bed with the rate of contraction or expansion depending upon heat and mass transfer coefficients, the heat and mass balances, and adsorbent thermodynamics (see, e.g., Handbook of Separation Techniques for Chemical Engineers—1979, § 3.1).

Referring to FIG. 1, the characteristics of a typical FP front are illustrated. Fluid feed entering bed 1 in the direction of arrow 2 (right to left) at feed entrance 3 passes along the fluid flow path 4 and leaves the bed via exit 5. The lengths of the adsorption front at various times during its passage along flow path 4 are shown at 6, 7, 8 and 9. As illustrated, as the front passes through the bed, the fraction of bed length where a loading gradient appears may grow progressively larger. Downstream of the front, conditions of 1, y, and T are characteristic of equilibrium between the adsorbent and the product. Upstream of the front the values of 1, y, and T are characteristic of equilibrium between the adsorbent and the feed. During adsorption, $\Delta 1$ and $\Delta y$ across the front in the direction of flow are negative. The length of bed remaining (as measured from the midpoint of the front) when adsorption is terminated determines how much of the bed is left unloaded. This length or mass of bed (D) constitutes the length of unused bed (LUB) mentioned above and has the property illustrated in FIG. 1: two regions, E and F of equal area set off by the line at LUB, which illustrates the midpoint of the adsorption front.

The residual mass present at the outset of the adsorption stage is largely contained in length or mass of bed A (the length of residual mass or LRM). As with LUB, areas B and C are equal.

As is apparent from FIG. 1, the fraction of the capacity of the bed actually used is reduced both by the length of unused bed and the length of the residual mass. However, LRM can be reduced to zero if, as generally taught in the prior art, regeneration is continued until the temperature of the fluid exiting feed entrance 3 during regeneration closely approaches the regenerant gas temperature.

Conventional Operation

FIGS. 2A–2E comprise a series of diagrams illustrating changes in bed loading, adsorbate concentration in the fluid, and temperature during regeneration. In the situation illustrated, regeneration is conducted with a substantially adsorbate-free hot fluid followed by an adsorbate-free cooling fluid. However, as will be discussed hereinafter, both in the prior art and in the operational method of this invention, the hot regenerant fluid and cooling fluid need not necessarily be adsorbate-free. Also, the discussion which follows assumes for purposes of simplicity in demonstrating the advantages of the invention that the regenerant and coolant streams are taken from the product stream. This, of course, need not be the case. In fact, there are situations (e.g. valuable feed streams) where a separate, cheaper fluid will be used for regeneration and cooling purposes. However, similar energy savings will nevertheless be achieved.

At the completion of the adsorption stage, the conditions of bed loading, adsorbate concentration in the fluid, and temperature adjacent the exit of the bed is depicted in FIG. 2A. In the usual case, the zone of increasing bed loading (1) and adsorbate concentration (y) depicted in FIG. 2A (and representing the loading or FP front) will not be allowed to exit the bed. In fact, it is typically a detected rise in adsorbate concentration (y) of the product (or a timed signal corresponding to the rise) which signals the controller to terminate the adsorption stage and begin regeneration.

As shown in FIG. 2B, regeneration starts as a hot dry regenerant fluid (R), enters the bed in a countercurrent direction to the adsorption stage flow. As the fluid enters the flow path, it first encounters the unused bed which is cool and substantially unloaded, giving rise to a pure thermal front designated RP. $\Delta y$ in this region is substantially zero, so the RP front moves at or slightly less than velocity $m_f C$.

Note that loading and adsorbate concentration do not substantially differ on opposite sides of the RP front illustrated in FIG. 2B, but that bed temperature on opposite sides of the front changes. The RP front immediately begins to collide with the less loaded end of adsorption front, then moves into progressively more loaded regions. This front, designated FP, is illustrated in FIG. 2A and FIG. 2B, and is bounded by a bed region wherein T, y, and 1 are characteristic of equilibrium with feed (section F) and by a bed section wherein T, y, and 1 have values characteristic of equilibrium between the adsorbent and product (section P). As shown in FIG. 2C, the collision of the RP and PF fronts causes an increase in the equilibrium fluid concentration (y). Adsorbate is stripped off the bed but is readsorbed downstream, heating and loading the bed.

As the RP front collides and passes through the FP front, a pair of new fronts are created, designated RW and WF (FIG. 2D). Front WF is a fast desorption front (velocity $m_f C$) bounded by downstream bed conditions characteristic of equilibrium with the feed and upstream bed conditions characteristic of equilibrium with adsorbate rich waste fluid produced during regeneration. The RW front is a slow desorption front bounded by a downstream bed section in equilibrium with waste and an upstream section in equilibrium with regenerant fluid. As illustrated, region W of the bed appears as a plateau in which the equilibrium temperature of the bed is intermediate that of the regenerant fluid and the feed fluid, and bed loading and adsorbate concentration are high. Because of the difference in speed between the WF and RW front, the plateau represented by the region W lengthens as regeneration continues. The collision and transformation of the fronts are of course not instantaneous. Also plateau W may exhibit variations as the new fronts contract and expand during formation.

Fast front WF quickly passes through the bed and breaks through the bed exit, at which time an increase in the temperature and adsorbate concentration of the effluent is observed. As regenerant fluid continues its passage through the bed, the RW front moves therealong. Its breakthrough is signalled by a decrease in adsorbate concentration in the effluent and an increase in its temperature approaching that of the hot regenerant. The situation in the bed at this point is depicted in FIG. 2E. In the prior art, this observed change in effluent characteristics serves as the signal to stop the flow of hot regenerant fluid and to begin cooling the bed back down to its operational temperature or a timer initiates this switch at a time corresponding to the change in effluent. Thus, as cool dry fluid (here unheated product) is fed along the bed's flow path, a cooling front PR passes rapidly therealong. Since $\Delta y$ and $\Delta 1$ across this front are essentially zero, the front is a pure thermal front having a speed close to C. While the thermal front is traversing the bed, the last vestiges of the RW front break through. When the thermal wave PR breaks out, the regeneration is complete, and the bed is ready for a return to the adsorption stage.

This conventional regeneration procedure and the four front procedure of the invention described below may be further understood from FIG. 3, a diagram depicting the temperature and adsorbate concentration properties of the product and of the effluent during regeneration in terms of the mass of fluid removed from the bed. The full length shown corresponds to the total mass of "initial product", i.e., the mass of adsorbate-free product recovered before any is used for regeneration. This is subdivided into "final product" (the mass of product left over after regeneration), and the portion of the initial product used for regeneration (which becomes effluent). The solid lines represent the effluent profile in the conventional system.

Starting at the right and moving toward the left, it can be seen that the regeneration stage effluent initially has an adsorbate concentration (y) and temperature (T) corresponding to the feed. The effluent then undergoes an increase in adsorbate concentration from $y_F$ to $y_W$ and an increase in temperature from $T_F$ to $T_W$. This change is caused by the breakthrough of the fast WF front. Next, the warm ($T_W$), adsorbate-rich ($y_W$) plateau comes through for a time until the RW front breaks through, signalling the controller to switch to coolant. As the RW front breaks through, adsorbate concentration in the effluent decreases to the level of the product; the temperature rises until it is substantially equal to the temperature of the regenerant gas ($T_R$) and remains at this level until the cooling wave comes through, lowering the temperature of the effluent to that of the product.

Since the process is cyclic, any heat or mass input must ultimately be liberated. Heat input to the system must equal heat out in the final product stream and the effluent stream. Similarly, the mass of adsorbate out in the effluent stream must equal the mass initially adsorbed from the feed.

Four Front Operation

In its broadest aspects, the operational method of the invention requires that the introduction of the cooling gas be initiated prior to the emergence of the midpoint of the RW front from the bed. Contrary to intuition and the generally held belief of the prior art, timing the introduction of cooling fluid in this way results in energy saving and increases in throughput with no deterioration of product quality. The benefits of operating in this manner are maximized if the introduction of the coolant is timed such that, when the RW front is at or breaking through the fluid exit, the RP cooling front (thermal front) is at the bed exit or at least in the last third of the bed length. This means that the thermal front and the major desorption (RW) front collide at the bed exit, or in effect, outside the bed exit.

If the RW front were a sharp step change then the ideal situation would be to have the thermal wave and the slow desorption wave reach the bed exit precisely simultaneously. This would result in just as thorough regeneration of the bed as in the prior art technique, but less hot regenerant fluid would be needed, thereby saving heat, reducing the fraction of product needed to complete regeneration, and increasing net yield (throughput). However, as mentioned with reference to the discussion of the adsorption front, the RW front is not an abrupt change but approaches the bordering equilibrium conditions asymptotically. Consequently, the cooling front RP will collide with part of the slow desorption front RW before RW completely leaves the bed. This cooling causes a decrease in y and greatly retards the desorption of any adsorbate mass it passes. The thermal front RP accelerates through the collision and emerges as a fast front. However, because the collision is incomplete, a mass of adsorbate is left on the adsorbent adjacent the feed entrance. This mass is the residual mass (see FIG. 1). Thus, in most cases, the bed is switched to adsorption duty before it is "completely" regenerated.

Figure 4A:
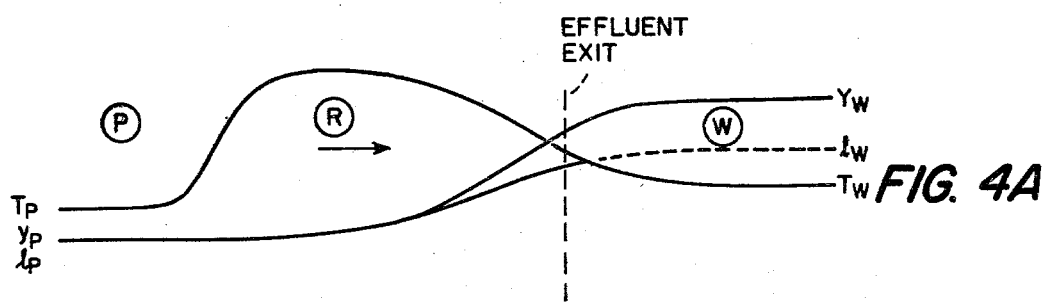
FIG. 4 is a schematic diagram illustrating the collision within the bed between a PR front and an RW front which occurs in a preferred embodiment of the process of the invention.
Figure 4B:
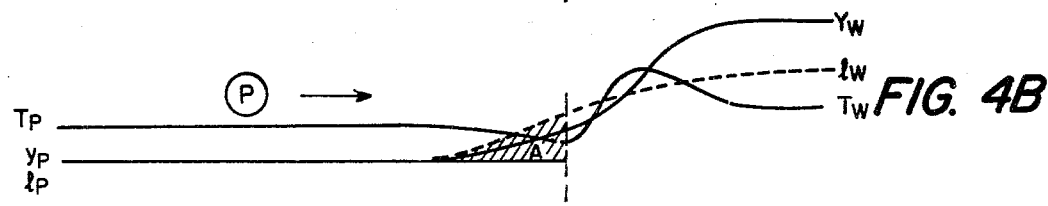

FIGS. 4A and 4B illustrate changes in y, 1, and T profiles as a result of the PR-RW collision at the fluid exit when operating in the four front mode at the optimum conditions. In FIG. 4A, the PR thermal wave is shown approaching the RW front which is partially broken through the effluent exit. As a result of the collision (FIG. 4B) adsorbate concentration in the fluid at first rises slowly approaching the bed exit and desorption is slow here. Then, at the instantaneous location of the major temperature rise, y increases rapidly. As this rapid transition breaks through, the bed is ready for adsorption duty. Area A beneath the loading curve represents a portion of the bed which has not been desorbed, i.e., the residual mass.

Figure 3:
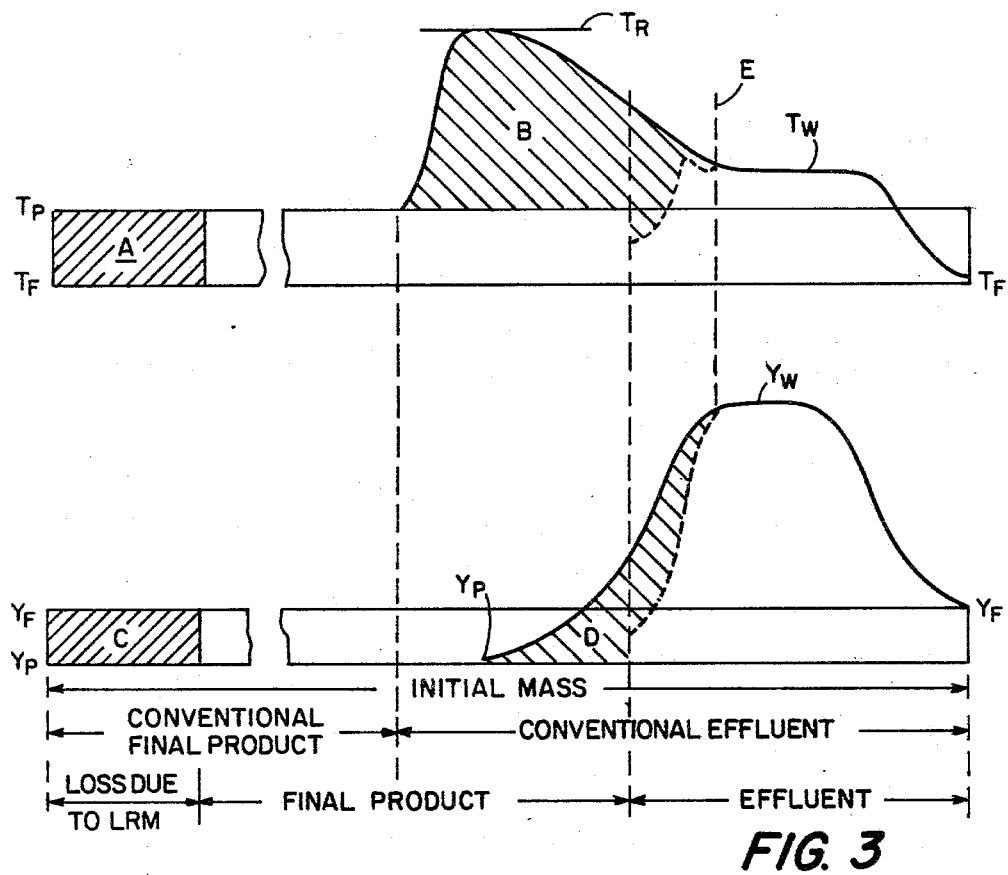
FIG. 3 is a graph illustrating the adsorbate/fluid feed mole ratio and temperature (vertical axis) of the effluent stream exiting an adsorption bed during the regeneration stage of a prior art conventional cycle (solid lines) and the cycle according to the invention (dashed lines). The horizontal axis represents mass of product.

As shown in FIG. 3, that regeneration is not taken to completion does not, on balance, adversely affect bed operation. In FIG. 3, the dashed lines represent the departure of the four front system from the prior art. At the outset, the curves are identical to the conventional system. However, at point E there is a marked departure from the conventional behavior. Specifically, the effluent exhibits a brief rise and then a rapid decline in temperature to a level somewhere intermediate the temperature of the product and feed, and the adsorbate concentration in the effluent decreases rapidly as compared with the conventional system. The predominant effect of these changes is a large heat saving equal to Area B and a reduction in the total adsorbate contained in the effluent represented by Area D. Note also that the temperature of the effluent need not ever attain $T_R$, the temperature of the hot regenerant. Area D represents the residual mass left in the bed after regeneration. This mass of adsorbate will be contained in a region of the bed (LRM) adjacent the feed entrance, as shown in FIGS. 1 and 4.

Since, in the operational method of the invention, the bed typically starts its adsorption cycle with some residual mass in place, less useful adsorption capacity is available and less initial product can be obtained. However, the loss of adsorption capacity is partially balanced by a savings in regenerant. Because less product is obtained, less heat exits with the product, saving heat represented by Area A. Furthermore, because the pure thermal wave (PR) accelerates during collision with the RW front, the mass of coolant required is reduced. Accordingly, some of the savings in regenerant is a savings in coolant which shows up as the temperature and adsorbate concentration changes exit the bed earlier relative to the time when the heat is turned off as compared with the conventional case.

From the foregoing it can be appreciated that the operational process of the invention can be implemented by a variety of specific methods, most of which require little or no costly equipment changes. If, for example, a currently operational bed system is to be modified for operation in accordance with the four front method, it is necessary only to alter the timing of the beginning and termination of the various streams. To obtain maximum benefit, the timing of the introduction of the coolant gas is set such that the desorption front RW reaches the end (effluent exit) of the bed at about the same time that the faster RP cooling front does. This is a change from conventional operation, wherein the cooling wave is started when the RW front reaches the end of the bed as indicated by decreases in adsorbate concentration and increases in temperature in the effluent gas.

The four front method has a major advantage over conventional bed operational techniques in that it reduces the mass of hot regenerant used in the conventional regeneration technique by an amount approximately equal to the mass of coolant used in a conventional case. Thus, the reduction in the amount of regenerant fluid required can be exploited as a reduction in regenerant flow rate. This adjustment in flow rate maintains regeneration time as it was in the conventional case, but results in significant heat savings as compared with the conventional operation.

Alternatively, the flow rate of the regenerant fluid can be maintained at its previous (conventional) level, but the cooling gas introduced sooner, resulting in shorter cycles, a more rapid regeneration, and more efficient equipment utilization. This means that in a given time period more product can be collected, or more adsorbate can be removed from a given mass of product (by employing a longer LUB).

As noted above, with the method of the invention, more residual mass will normally be left in the bed than with conventional systems, thereby reducing the fraction of the adsorbent material in the bed that is actually used for adsorption. This results in a lower mass of initial product produced per cycle, but this can be at least partially offset by the lower mass requirements for regeneration.

To ensure that near the end of adsorption duty the product remains uncontaminated with absorbate, adsorption should be terminated when $y_p$, the concentration of adsorbate in the product, exceeds some predetermined specification. This step can be effected automatically if an adsorbate concentration sensor is used to detect increases in $y_p$, and the signal produced by the sensor is used to terminate the adsorption stage. This aspect of the control is identical to the prior art.

In another alternative, especially useful when each cycle is substantially identical in feed parameters and flow rates, a simple timer can be used to initiate the various stages. A flow integrator can be used where flow rates vary but feed parameters do not. Where variations in feed parameters are encountered, timers may nevertheless be effectively employed if the cycle is set up to switch from adsorption to hot regenerant flow and to change from hot to cooling flow at times corresponding to a "worst case", that is, a maximum permissable adsorbate loading. In this situation, in a cycle where feed parameters were such as to load the bed only lightly, cooling flow may be initiated by the timer well after the RW front exits the bed. However, a system of this type will nevertheless save energy and have other significant advantages as compared with conventional operation.

The amount of hot regenerant fluid used in the regeneration stage may also be varied. If it is increased, the residual mass decreases but more heat is wasted in the process. If the amount of regenerant fluid is decreased, there will be an additional heat savings but the length of residual mass will increase.

During regeneration, the cooling front traverses the entire length of the bed somewhat faster, as compared with the conventional cycle, because it accelerates through the collision with the RW front. The total mass of coolant used can accordingly be somewhat reduced. However, it may not be desirable to do so under conditions of widely variable feed conditions and flows.

As will be apparent from the foregoing, all of the flow masses are reduced in the four front method of operation, although the mass of hot regenerant has been reduced the most. It may also be advantageous in some cases to reduce the regeneration stage flow rates so that adsorption time and regeneration time are in fairly close agreement. This per se will tend to contract the RW front and reduce the residual mass.

In cases where the operating situation is variable, control of the operation may conveniently be accomplished with the aid of a temperature sensor disposed within the body of the adsorbent material in the bed. Such a sensor provides a signal generated in response to the passage of a front which triggers a change from hot regenerant to cooling fluid flow. Unlike the conventional operation wherein temperature probes at the bed exit are often used to initiate coolant flow, an internally placed probe can time the system such that cooling fluid is introduced long before any substantial change in temperature is detectable at the bed exit. The placement of the probe anywhere within the bed will initiate the cooling flow earlier than before and save some heat. However, the preferred placement is such as to result in a collision of the RW and PR fronts at or adjacent the bed exit. If the sensor is placed in the unloaded region of the bed (LUB, adjacent the product exit) it will be set off by the PR front since the front will not as yet have collided with the adsorption front. A sensor placed well into the loaded bed region will "see" a well formed RW front. If the temperature probe is placed near the point where the thermal front RP collides with the adsorption front PF (prior to formation of the RW front), then some empirical determination of the placement will be needed.

When a temperature probe is used directly to initiate the flow of cooling fluid, for optimal results its location along the bed flow path should set off the length or mass of loaded bed that the RW front will traverse while the PR front passes from the fluid entrance to a point at, just outside, or just inside the fluid exit. There are several methods available for estimating what fraction of the bed such a sensor should set off. These methods may also be used to calculate an estimate of a suitable time after the start of regeneration when coolant flow should be started.

The simplest method is to determine by measurement in a conventional cycle the length of time, t, required for the PR front to traverse the bed, i.e., the length of time between the beginning of coolant flow and the emergence of the cooling wave. This measurement is an estimate of the quantity (bed mass/$m_fC$). To modify operation to the four front method, cooling is then timed to begin t minutes earlier. To place the temperature sensor, the velocity of the RW front may be calculated from $m_f(C+H\Delta y/\Delta T)$ where $\Delta y$ and $\Delta T$ are measured across the RW front. The appropriate distance for the placement will thus be such as to set off a mass of bed equal to $tm_f(C+H\Delta y/\Delta T)$ on the wet effluent exit end of the bed. If the collision with the temperature sensor is to occur in the LUB, the sensor should be placed such as to set off a mass of bed equal to the difference between the length of time hot regenerant flowed in the conventional operational mode and t, multiplied by $m_fC$.

It should be emphasized that to optimize the cycle any such estimate can be perfected empirically.

The temperature probe has the advantage that it can accommodate variation in feed or regenerant flows and adsorbate concentrations better than a timer. If the temperature probe is placed within the loaded region, it has the additional advantage that even if the bed loading varies or the velocity of the RW front varies, the system will push the RW front to the temperature probe and then apply the heat stored in the bed to complete the regeneration. Thus, regeneration is conducted to essentially the same point despite variations in the amount of adsorption that feed variations can cause.

It should be noted that control of the system can be exercised by the use of any sensor which detects an intrinsic property of the fluid within the bed, and is not limited to a temperature sensor. An adsorbate concentration detector would be one example.

In the foregoing discussion it has been assumed that the regenerant fluid is hot, substantially adsorbate-free product and that the cooling flow comprises cool, adsorbate-free product. These assumptions have been made for clarity of explanation. The hot and cool regenerant streams, as in certain prior art systems, may of course comprise a separate purge gas and in fact, there are several situations where adsorbate will be present in significant concentration in the hot regenerant stream. For example, if the hot regenerant stream comprises heated feed, a hot purge stream containing some adsorbate, or effluent recirculated through a condenser and heater, it may contain a significant adsorbate concentration. Also, lower temperature regeneration or excessive breakthrough can result in a small adsorbate concentration in the product stream which may in turn be used for regeneration.

In these situations the application of the four front method remains fundamentally unchanged. Thus, the quantity of regenerant used may be cut back until the savings of heat and effluent is offset by the residual mass and its resulting reduction in capacity. Also, the estimates used to start and stop the various stages may be affected. For example, if regeneration is conducted with adequately hot regenerant containing adsorbate and coolant is substantially adsorbate-free, then the "adsorbate-free" end of the bed will in fact have a low but finite loading since it is in equilibrium with the hot regenerant. The cooling front accordingly involves some adsorbate concentration variation, and the transition from product to regenerant breaks up into two fronts, a relatively fast desorption front and a slower thermal front (velocity $m_fC$) where the bulk of the temperature transition (cooling) occurs. When the bed is cooled with adsorbate-free product, the fast desorption wave which strips residual adsorbate will collide with the slower desorption front RW, altering its velocity. Thus, there will be more error in setting the temperature probe than in the dry fluid case, and the empirical determination of the optimal timing becomes increasingly important. It is the cooling front component of this PR transition which controls the timing for collision with the regeneration front. Also the emergence of the front produced after the desorption component of the PR front collides with the RW front should not be confused with the main desorption front.

The effluent profile will thus show an additional concentration variation when hot regenerant and/or coolant contain adsorbate. Although there will also be a change in the mass of fluid needed to cool the bed, the mass of coolant used in the conventional case will still give a good estimate of how much less hot regenerant may be used in the four front system.

EXAMPLE

As an aid to those skilled in the art in setting up the operation of a bed to take advantage of the invention and to illustrate those advantages, the following example is offered.

Assume an adsorption bed packed with granulated active carbon used to remove benzene from a nitrogen stream wherein the heat capacity of the solid ($Cp_s$) is 405.0 cal/liter °K., the heat capacity of the fluid ($Cp_f$) is 6.95 cal/mol °K., and the enthalpy of adsorption $(-\Delta H_{ads})$ is 10,400 cal/mole of benzene. In this case, the ratio of the heat capacities of the fluid and solid (C) is 0.017 liters/mole and the ratio of the enthalpy of adsorption to the heat capacity of the solid (H) is 25.68 liters/mole °K. The $N_2$ is at 1 atmosphere pressure. The benzene concentration in the feed is $1.0 \times 10^{-3}$ moles/liter and that of the product is less than $1.0 \times 10^{-6}$ moles/liter. Adsorption is conducted at 100° F.; regeneration is conducted with countercurrent flow at 300° F. with heated product. The bed is operated so that 67% of its length is employed for adsorption duty; thus, the loaded zone length/LUB ratio equals 2. The total length of the bed may thus be expressed as 3LUB.

In this situation, during either the conventional or the four front operational modes, during each complete adsorption-regeneration cycle there are produced FP, RW, and WF fronts which tend strongly to become fixed profiles moving at a substantially constant speed and a thermal front (RP) which moves at velocity C. In this system, the heat and mass balance velocities as a close approximation tend toward equality so that the velocities of the fronts, $v_f$ equal $m_f (\Delta y/\Delta l) = m_f (C+H\Delta y/\Delta l)$. Also $\hat{y} = 2115$ moles Benzene/mole $N_2$ $T^{\frac{1}{2}}e - (-\Delta H_{ads}/RT) \times (l)/(L-(l)) \cong y$, where $\hat{y}$ is the equilibrium adsorbate concentration at a given loading and temperature, which prevails at points F, P, R, and W. T is here in °K., the absolute temperature. L equals the maximum loading (here 5.5 mole/liter), and the letter (l) equals bed loading in moles/liter. Employing these equations and the adsorbent property data given above (taken from Rhee, Heerdt, and Amundson, *Chemical Engineering Journal*, (1) (1970) p. 281), the mole ratio of benzene to nitrogen (y), the bed loading in moles/liter (l), and the temperature (now °F.) characteristic of the equilibrium conditions between the bed and the feed (F), product (P), regenerant gas (R) and waste (W) are as follows:

| Point | $y\left(\dfrac{\text{mol benzene}}{\text{mol N}_2}\right)$ | $1\left(\dfrac{\text{mol benzene}}{\text{liter solid}}\right)$ | T(°F.) |
|---|---|---|---|
| F | $1.0 \times 10^{-3}$ | 1.9 | 100 |
| P | $\cong 0\ (<1.0 \times 10^{-6})$ | $\cong 0$ | 103 |
| R | $\cong 0\ (<1.0 \times 10^{-6})$ | $\cong 0$ | 300 |
| W | $2.1 \times 10^{-2}$ | 2.7 | 194 |

Since the velocity of the respective fronts are given by $m_f(\Delta y/\Delta l)$ across the front (mass balance) or alternatively by $m_f(C+H\Delta y/\Delta T)$ (heat balance), it follows that the velocities of the respective fronts, in liters of adsorbent passed per second (when $m_f$ is moles $N_2$/second), may be estimated as follows:

$$v_{FP} = m_f(\Delta y/\Delta l) = 5.3 \times 10^{-4}\, m_f$$

$$v_{PR} = m_f(C + H\Delta y/\Delta T) = 1.7 \times 10^{-2}\, m_f$$

$$v_{RW} = m_f(C + H\Delta y/\Delta T) = 7.8 \times 10^{-3}\, m_f$$

$$v_{WF} = m_f(\Delta y/\Delta l) = 2.5 \times 10^{-2}\, m_f$$

Using these data, it is possible to analyze a conventional adsorption-regeneration cycle and a four front cycle and to compare their efficiencies in terms of heat consumed, final product yield, etc.

Conventional Cycle

At the outset the bed is totally regenerated. Feed enters the bed and produces an adsorption (FP) wave which traverses the bed at a velocity $v_{FP}$, equal to $m_f(\Delta y/\Delta l)$ across the adsorption front, $5.3 \times 10^{-4}\, m_f$ liters/second. Adsorption continues until two-thirds of the mass of adsorbent in the bed is loaded. At this point, (see FIG. 5A) the regeneration cycle begins with the introduction of hot (300° F.) product in a countercurrent direction. As the regenerant enters the length of unused bed, a pure thermal (RP) wave is formed which moves along the bed at a velocity $v_{PR}=1.7 \times 10^{-2}\, m_f$ liters/second. During the time the thermal PR front is traversing LUB, the adsorption wave moves back toward the feed entrance a distance equal to $(v_{FP}/(m_fC-v_{FP}))$ LUB from the product exit (see FIG. 5B). This leaves a loaded bed length of 3LUB−LUB $[1+(v_{FP}/(m_fC-v_{FP}))]$ or LUB $[2-(v_{FP}/(m_fC-v_{FP}))]$ which must be regenerated. As a result of the collision, a WF front having a velocity $v_{WF}=2.5 \times 10^{-2}\, m_f$ liters/second and an RW front having a velocity of $7.8 \times 10^{-3}\, m_f$ liters/second emerge. The faster WF front traverses the remaining bed distance followed by the RW front (see FIG. 5C). The breakthrough of the RW front is indicated by an abrupt rise in effluent temperature, and this occurrence is used to trigger the introduction of cooling fluid. The cooling fluid sets up a PR thermal front which rapidly traverses the entire bed length, 3LUB, at a velocity equal to $m_fC=v_{PR}=1.7 \times 10^{-2}\, m_f$ liters/second (see FIG. 5D). At this point the cycle is complete.

The effluent output is qualitatively described in FIG. 6, where the x axis represents the mass of product obtained after adsorption (before any is heated and used for regeneration), and the y axis represents temperature. At the beginning of the regeneration hot regenerant flows in but the effluent is at the temperature of the feed. As desorption continues, the WF front breaks through with its corresponding increase in effluent temperature. This is followed somewhat later by the RW front and finally by the PR front, or cooling wave. Hot regenerant enters the bed until the RW front breaks through. Where $Vol_{LUB}$ is the volume of the LUB, it will take $Vol_{LUB}(1+v_{FP}/(m_fC-v_{FP}))/C$ of regenerant mass to force the thermal PR front along the bed so that it collides with the adsorption (FP) front. Additional regenerant mass, equal to $Vol_{LUB}(2-v_{FP}/(m_fC-v_{FP}))m_f/v_{RW}$ will be required before the RW front breaks through. The total mass of hot regenerant used is thus the sum of these quantities (see FIG. 6). The mass of coolant gas required, where the total volume of the bed is $Vol_{BED}$, will equal $Vol_{BED}/C$ plus the PR front spreading, which in this case is negligible. Since, in this example, a portion of the initial product is heated and used as the regenerant and another portion is used as the coolant, both must come out of the mass of initial product, equal to $2m_fVol_{LUB}/v_{FP}$.

Substituting values for C, $v_{FP}$, and $v_{RW}$ in these expressions, the mass of initial product turns out to be $3.8 \times 10^3 \times Vol_{LUB}$ moles, the mass of hot regenerant used is $3.1 \times 10^2 \times Vol_{LUB}$ moles, and the mass of coolant used is $1.8 \times 10^2 \times Vol_{LUB}$ moles. It thus may be seen that of the total mass of product initially collected, about $0.49 \times 10^3\, Vol_{LUB}$ moles, or about 13% is used for regeneration, and the other 87% represents final product. More than 230,000 $vol_{LUB}$ calories of heat are required for regeneration.

Four Front System

To practice the four front system, in its broadest aspects, requires that the cooling gas be introduced at a time prior to the breakthrough of the main desorption RW front. This will save regenerant, cooling gas, and heat. However, to optimize the operation it is preferred to time the introduction of the cooling gas such that the thermal front it produces is at least in the last third of the bed when the RW front is exiting the bed. Preferably the thermal front reaches the fluid exit at the time the RW front is exiting the bed.

In order to utilize the four front system to modify the operation of the conventional system discussed above, flow of the cooling gas is initiated, ideally, when the RW front (if already formed) is at a position such that, at its velocity $v_{RW}$, it will emerge at the fluid exit, or in effect be at a position just outwardly of the fluid exit, in an amount of time equal to that required for the PR cooling front to traverse the bed and catch up to the RW front. As noted above, the timing may be done by various techniques. A preferred approach is to place a temperature sensor in the bed which, when triggered by a rise in temperature, sends a signal to switch the regenerant flow to coolant gas, either immediately or within a given preselected time.

The precise timing of the switch from hot regenerant to coolant will depend on many factors, including which of the various possible advantages are considered most important. For example, in a given system, flow rates and switching times from the adsorption stage to the regeneration stage, and from hot regenerant flow to cooling flow may be altered to optimize throughput, to decrease the heat needed for regeneration to a minimum, to provide a more adsorbate-free product, to provide greater security against breakthrough of feed, or to achieve a combination of these goals. By calculating the velocity of the various fronts as described above, it is possible to estimate the time after initiation of hot regenerant flow when coolant should be started.

However, because of inherent inaccuracies in the model upon which the foregoing analysis is based, for best results the estimate should be sharpened empirically, a task well within the skill of the art in view of this disclosure.

In the case described above, the RW front moves at velocity $v_{RW} = 7.8 \times 10^{-3}$ m$_f$liters/second and the cooling front at velocity m$_f$C = $v_{PR}$ = $1.7 \times 10^{-2}$ m$_f$ liters/second. If the cooling wave starts when the RW wave passes a point located at a distance $1 - v_{RW}/(m_f C)$ from the product exit end of the bed, the thermal front will traverse the whole bed while the RW front traverses the last 46% of the bed. Accordingly, a temperature probe placed at 0.54 Vol$_{BED}$ from the product exit end which triggers a switch to cooling gas when the temperature of the fluid rises to a point intermediate $T_W$ and $T_R$ (e.g., 250° F.) will be effective to induce collision of the fronts at or slightly before the feed entrance.

Because regenerant fluid flow is stopped earlier, Vol$_{BED}$/C of fluid and the heat required to raise it from the 103° F. product temperature to the 300° F. regeneration temperature is saved. Thus, the mass of hot regenerant needed in the four front system is ($3.1 \times 10^2$ moles/liter $- 1.8 \times 10^2$ moles/liter) Vol$_{LUB}$, or $1.3 \times 10^2$ Vol$_{LUB}$ moles. Thus, less than 50% (or about 100,000 Vol$_{LUB}$ calories) of the heat used in the conventional system is required. The total amount of regenerant used is only about two-thirds of that in the conventional system, thus about 9% of the initial product instead of 13% is used for regeneration.

In the case described here (active carbon-benzene) mass transfer is dominated by Knudsen diffusion and surface diffusion. Both tend to cause the RW regeneration front to be more contracted than the FP adsorption front. Since the RW front is shorter than the FP front, the length of residual mass, LRM, is also shorter than the LUB. The LUB region in this example is less than 20% loaded (total), and thus the residual mass will be a small fraction of this. Since the residual mass is small, the decrease in the mass of coolant required and the decrease in initial product recovered in the four front system, as compared with the conventional system, will also be small. This source of error in the foregoing calculations is small enough so that its effect would be masked by normal fluctuations in feed and regenerant.

Scope of Application and Summary of Advantages

In view of the foregoing, it should be apparent that the operation of adsorption beds in the manner described above is accompanied by advantages that may be exploited in various ways. A major advantage is that substantially less heat is needed to regenerate the beds without a commensurate loss in bed capacity. Thus, regeneration is more energy efficient. The system also requires less massive regeneration streams. This implies that the beds can be regenerated at a slower fluid velocity, thereby saving pumping energy, or can be regenerated faster, allowing a higher rate of throughput. The bed need not be as large as a conventionally operated system to achieve a given processing capacity. Alternatively, sacrifices in throughput rate may be made in favor of the production of a more adsorbate-free product. In this case, the adsorption stage is terminated with a larger LUB, thus producing a purer but less massive initial product.

A comparison of the curves shown in FIG. 3 shows that in the conventional operational mode the effluent stream rises in temperature from $T_W$ to $T_R$ as the adsorbate concentration in the effluent stream is tapering off. If adsorbate is collected and concentrated from the effluent stream, then either an effluent having an average temperature intermediate $T_W$ and $T_R$ must be dealt with or some of the higher temperature adsorbate containing effluent must be discarded. With the four front system, adsorbate is emitted in a shorter pulse and its average temperature is lower. This fact has advantages in reducing the load on condensation or absorption equipment.

With the conventional system, the waste heat released during bed cooling is proportional to the entire mass of the bed. This fact makes substantial saturation of the bed with adsorbate a desirable goal and mandates that long beds be used to counteract the length of unused bed. With the four front system described above, this loss term is substantially eliminated because one does not pay the same large penalty in wasted heat for using shorter beds with shorter loading zones. Thus, the beds may be shortened until the mass of regenerant relative to the mass of initial product becomes a binding constraint.

This decrease in length of the loading zone relative to the length of the unused bed is a design asset which can be used in a number of ways. For example, the feed flow velocity can be increased during the adsorption stage, resulting in stretching of the adsorption front (FP) and a greater length of unused bed. However, more feed is processed in a given time without any loss of product quality. Alternatively, the bed could be made shorter without loss of processing capacity and could be operated with reduced pressure drops, reduced capital costs, or savings in some combination of the two. For example, the bed length could be reduced somewhat, keeping the same pressure drop but increasing the throughput.

Also, as noted above, the length of unused bed can be increased to obtain greater security against breakthrough and/or greater product dryness while maintaining the same overall bed length. Even without increasing the length of unused bed, the decrease in size of the loaded zone increases security against breakthrough. When adsorption velocity ($V_{FP}$) changes, the length of the loaded zone changes proportionately. A smaller (shorter) loaded zone will produce smaller variations, thus encroaching less on the LUB.

Absorption bed systems exhibit a wide variety of alternative modes of operation including alternative regeneration techniques, other flow configurations, and various adsorbent-adsorbate pairs and feed fluids. The four front system as disclosed herein is not appropriate for use in "pressure swing" adsorption, regeneration with unheated purge fluid, or bulk separations, but works well with thermal swing adsorption in cleaning or recovery applications, generally where the adsorbate is present in the fluid feed at concentrations below about 15 mole percent.

The hot regenerant fluid may comprise feed, product, a separate purge gas, or recirculated waste from which adsorbate has been partially removed. As used herein, "waste" includes systems where the goal is to concentrate adsorbate from a dilute stream. Improved performance can be obtained through the use of the four front system for all of these regeneration fluids. It is also contemplated that feed (or wet purge fluid) may be used as coolant fluid if product of higher adsorbate content is tolerable.

Multiple adsorbent beds arranged in series or parallel have been discussed by Vermeulen et al. in the Chemical Engineers' Handbook (5th Edition, R. H. Perry ed., pp. 16-10, 1973). All of the systems described there exhibit improved performance if operated in accordance with the four front system described herein. This system can also be used in adsorbent beds which utilize radial flow from a central inflow pipe outwardly to the vessel wall and in the more conventional axial flow through the length of the bed.

In the prior art, regeneration and cooling streams are sometimes moved in the same direction as the feed flow (coflow). In the four front system, coflow is tolerable provided that the hot and cool regenerant streams are passed through the bed in the same direction. This results in a product of higher adsorbate concentration as compared with countercurrent heating and cooling with adsorbate-free fluid. Fluid flows in the four front system may be in an upward, downward, or horizontal direction, or radially directed.

Figure 7:
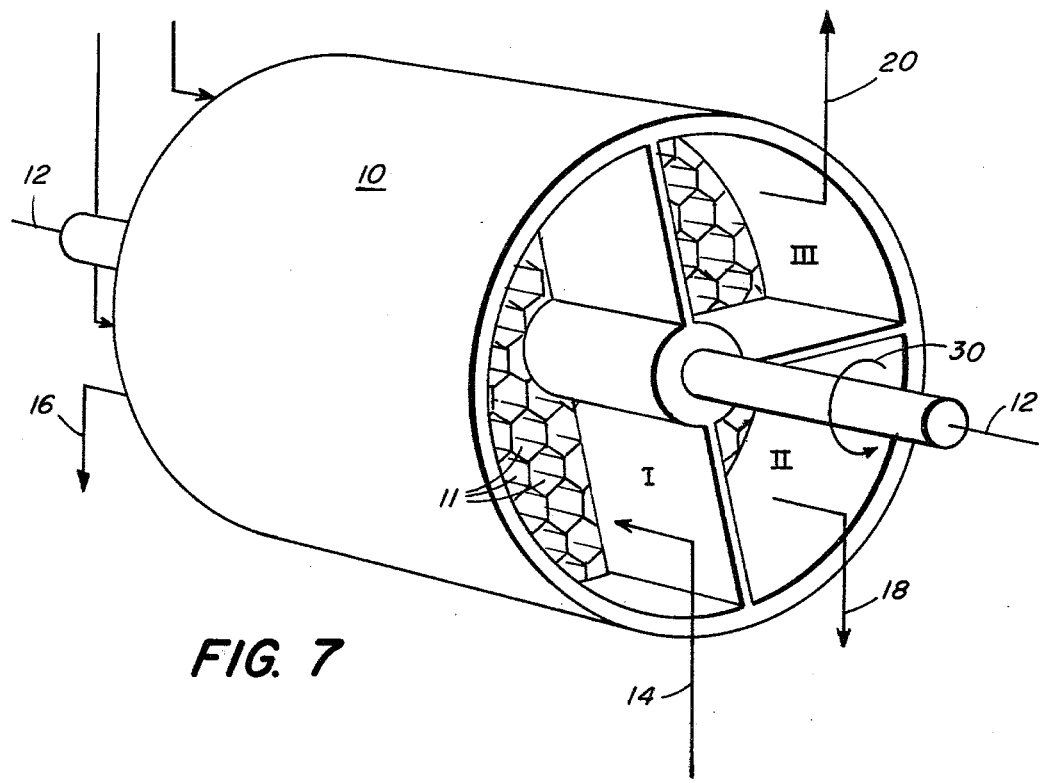
FIG. 7 is a schematic diagram of a rotating adsorption bed comprising three compartments.

The four front system may be used also with rotating or other moving bed arrangements such as compartmentalized structures which include means for directing fluid flow to a selected compartment so that regeneration, cooling, and adsorption occur simultaneously. FIG. 7 schematically illustrates one such arrangement wherein a tubular housing structure 10 has a central axis 12 and three compartments (I, II, and III). Each compartment features a plurality of flowpaths 11 which together comprise an integral unit which rotates about axis 12 in the direction of arrow 30. Each flowpath contains or is in contact with one or more adsorbent materials. The bed includes a feed line 14 which passes feed through the flowpaths of bed compartment I where it emerges in line 16 as product, a hot regenerant line 18 which passes hot regenerant fluid along the flowpaths of compartment II, and a coolant line 20 which passes cooling fluid along the flowpaths of compartment III. Rotation of the bed results in each flow path sequentially undergoing adsorption, regeneration and cooling. The timing required to operate the bed in the four front system translates here to rotational speed times the angular size of the compartments. Fluid flow rate $m_f$, translates to fluid flow rate per unit area. See P. C. Wankat, *The Relationship Between One-Dimensional and Two-Dimensional Separation Processes*, AIChE Journal, Vol. 23, No. 6, p. 859 (Nov. 1977).

Fluidized beds can also be operated in the four front system mode, but during regeneration the bed must be fixed and not mixed to a uniform concentration.

Beds operated in accordance with the invention may comprise many different adsorbent/adsorbate pairs. Non limiting examples include:
$H_2O$/silica gel
$H_2O$/activated alumina
$H_2O$/alumina gel
$H_2O$/molecular sieve zeolite
$CO_2$/activated carbon
$CO_2$/molecular sieve zeolite
Hg/zeolite
Hg/activated carbon
$NO_x$/zeolite
$NO_x$/activated carbon
$SO_x$/zeolite
$SO_x$/activated carbon
$H_2S$/zeolite
$H_2S$/activated carbon
salt/thermally regenerable ion exchange resin
organic species/activated carbon In addition, beds consisting of mixtures of adsorbents or multiple layers of different adsorbents and inerts such as disclosed in U.S. Pat. No. 3,738,084 can benefit from the system.

Figure 8:
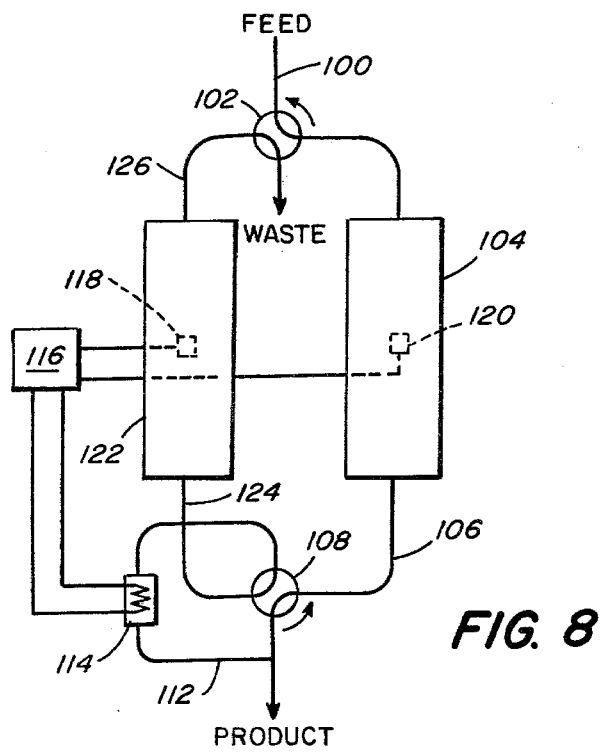
FIG. 8 is a schematic diagram of a conventional bed system modified for use in the four front method.

FIG. 8 illustrates a common bed configuration which allows a continuous feed stream to be continuously treated. Feed entering line 100 passes through valve 102 and enters bed 104 which has been previously regenerated and now is being operated in the adsorption mode. Product exits the bed through line 106, passes through valve 108, and finally to the product delivery line.

A line 112 takes a portion of the product stream for regeneration. To produce hot regenerant, heater 114 is actuated by a control 116 which operates in response to temperature sensors 118 and 120, disposed within the beds. Hot regenerant exits heater 114, passes through valve 108, and is delivered to bed 122 via line 124. Waste produced during regeneration exits bed 122 through line 126, passes through valve 102, and is delivered for appropriate downstream treatment.

Sensors 118 and 120 enable control of the regeneration stage so that the four front system can be exploited. Thus, in bed 122 during regeneration, as sensor 118 detects the passage of the RW front, it produces a signal to control 116. The control then actuates the cooling phase by turning off heater 114. Cooling flow is then continued through bed 122 until the end of the regeneration stage as described above is reached, at which time bed 122 is ready for adsorption duty, and bed 104 is ready for regeneration. Simultaneous switching of the valves 102 and 108 then reverse the roles of beds 104 and 122.

The invention may thus be embodied in other specific forms without departing from the spirit and scope thereof. Accordingly, other embodiments are within the following claims.

What is claimed is:

1. A method of operating an adsorption bed having an adsorbent material disposed within a housing defining a feed entrance, a fluid flow path, and a product exit, said adsorbent material being of the type used to reduce the concentration of an adsorbate carried by a fluid feed, said method including cycling the bed through an adsorption stage wherein the fluid feed is passed through the bed and a fluid product of reduced adsorbent concentration is collected at the product exit, and a thermal regeneration stage wherein a hot regenerant fluid and a cooling fluid are serially passed through the bed co-currently to one another to produce a fluid waste having an adsorbate concentration substantially greater than said fluid feed at a waste exit wherein, during said regeneration stage, there is created in the bed an RW front having a first velocity, said RW front being bounded on its downstream side by bed conditions characteristic of equilibrium between the adsorbent material and the fluid waste and on its upstream side by bed conditions characteristic of equilibrium between the adsorbent material and the hot regenerant fluid, and upstream of said RW front, there is created in the bed by the introduction of said cooling fluid having a lower temperature than said regenerant fluid, a thermal front having a velocity greater than said first velocity, said thermal front being bounded on its downstream side by high temperature conditions and on its upstream side by low temperature conditions, wherein the improvement comprises:
introducing said cooling fluid into the bed before the midpoint of the RW front exits the bed to produce, during a portion of the cooling fluid flow, fluid waste at said waste exit having an adsorbate concentration substantially greater than the adsorbate concentration of said feed.

2. The method of claim 1 wherein the timing of said cooling fluid introduction results in the collision of said RW and thermal fronts adjacent said waste exit.

3. The method of claim 1 wherein the timing of said cooling fluid introduction is such that when the midpoint of said RW front is at the bed exit, said thermal front is within the bed in the one-third mass of said adsorbent material adjacent said waste exit.

4. The method of claim 1 or 2 wherein the adsorbate and adsorbent comprise a pair selected from the group consisting of $H_2O$/silica gel, $H_2O$/activated alumina, $H_2O$/alumina gel, $H_2O$/molecular sieve zeolite, $CO_2$/activated carbon, $CO_2$/molecular sieve zeolite, Hg/zeolite, Hg/activated carbon, $NO_x$/zeolite, $NO_x$/activated carbon, $SO_x$/zeolite, $XO_x$/activated carbon, $H_2S$/zeolite, $H_2S$/activated carbon, salt/thermally regenerable ion exchange resin, and organic species/activated carbon.

5. The method of claim 1 or 2 wherein the feed comprises a fluid selected from the group consisting of water, air, and natural gas.

6. The method of claim 1 or 2 wherein a feed stream is alternatively delivered to a subset of a plurality of beds, operated in the adsorption stage, while the other of said beds is operated in the regeneration stage.

7. The method of claim 1 or 2 wherein the introduction of said cooling fluid is triggered by a signal generated by a timing means.

8. The method of claim 1 or 2 wherein the introduction of said cooling fluid is triggered by a signal generated by means for sensing an intrinsic property characteristic of fluid at a selected point within the bed.

9. The method of claim 8 wherein said means for sensing comprise a temperature sensor disposed within the adsorbent within said bed, said signal being generated in response to a change in temperature within a portion of said bed and being indicative of the movement of a front past said temperature sensor.

10. The method of claim 1 or 2 wherein said bed defines an axial fluid flow path disposed between a feed entrance and said product exit.

11. The method of claim 1 or 2 wherein said bed defines a radial fluid flow path disposed between said feed entrance and said product exit.

12. The method of claim 1 or 2 wherein said bed is operated as a fluidized bed during said adsorption stage.

13. The method of claim 1 or 2 wherein said bed comprises a compartmentalized structure and a plurality of flowpaths and includes means to direct a selected fluid flow through a selected compartment of said structure whereby regeneration, cooling, and adsorption are conducted substantially simultaneously.

14. The method of claim 1 or 2 wherein said fluid feed is treated to reduce the concentration of a plurality of adsorbates.

15. The method of claim 1 or 2 wherein said bed comprises a plurality of adsorbent materials.

16. The method of claim 15 wherein said adsorbent materials are arranged in layers along said flow path.

17. The method of claim 1 or 2 wherein product is used as the fluids in said regeneration stage and wherein the sum of the mass of hot regenerant fluid and cooling fluid is less than about 60% of the mass of the feed.

18. The method of claim 1 or 2 wherein said hot regenerant comprises a fluid selected from the group consisting of heated product, heated feed, heated purge gas, and heated, recirculated waste fluid of depleted adsorbate content.

19. The method of claim 1 or 2 wherein said hot regenerant and said cooling fluid are substantially adsorbate-free and, on the introduction of said cooling fluid, there is created within the bed a PR front comprising said thermal front, said PR front being bound on its downstream side by bed conditions characteristic of equilibrium between the adsorbent material and the hot regenerant fluid and on its upstream side by bed conditions characteristic of quilibrium between the adsorbent material and the cooling fluid.

20. The method of claim 1 or 2 wherein at least one of said hot reagent fluid and said cooling fluid contains a substantial adsorbate concentration.

21. The method of claim 1 or 2 comprising the additional step of recovering adsorbate from said waste.

22. A method of operating an adsorption bed having an adsorbent material disposed within a housing defining a feed entrance, a fluid flow path, and a product exit, said adsorbent material being of the type used to reduce the concentration of an adsorbate carried by a fluid feed, said method including cycling the bed through an adsorption stage wherein the fluid feed is passed through the bed and a fluid product of reduced adsorbate concentration is collected at the product exit, and a thermal regeneration stage wherein a hot regenerant fluid of temperature $T_R$ and a cooling fluid are serially passed through the bed co-currently to one another to produce a fluid waste having an adsorbate concentration substantially greater than said fluid feed at a waste exit, said fluid waste having a maximum adsorbate concentration, $Y_{MAX}$, wherein the improvement comprises:
switching the flow of fluid entering the bed during regeneration from hot regenerant fluid to cooling fluid after the adsorbate concentration in the fluid falls below about 0.5 $Y_{MAX}$ at a selected point within the bed whereby during a portion of the cooling fluid flow the adsorbate concentration of said fluid waste exiting the bed is substantially equal to $Y_{MAX}$.

23. The method of claim 22 comprising the step of triggering said switching with a signal generated by means for sensing an intrinsic property related to adsorbate concentration in fluid within the bed.

24. The method of claim 22 wherein said selected point lies along said flow path at a location so that the regeneration stage is complete before fluid waste exiting said waste exit reaches $T_R$.

* * * * *